United States Patent [19]

Jakobsson et al.

[11] Patent Number: 4,647,469
[45] Date of Patent: Mar. 3, 1987

[54] DEHYDROFREEZING OF PEELED APPLE PIECES

[75] Inventors: Maja Jakobsson, Alnarp; Christina Skjöldebrand, Gothenburg; Ingegerd Sjöholm, Alnarp, all of Sweden

[73] Assignee: Karakas - Kiviks Fruktodlingar & Musteri Aktiebolag, Kivik, Sweden

[21] Appl. No.: 802,002

[22] PCT Filed: Feb. 11, 1985

[86] PCT No.: PCT/SE85/00065
§ 371 Date: Nov. 12, 1985
§ 102(e) Date: Nov. 12, 1985

[87] PCT Pub. No.: WO85/03413
PCT Pub. Date: Aug. 15, 1985

[30] Foreign Application Priority Data

Feb. 10, 1984 [SE] Sweden .................................. 8306970

[51] Int. Cl.[4] ............................................... A23L 3/36
[52] U.S. Cl. ...................................... 426/524; 426/509
[58] Field of Search ................ 426/509, 524, 465, 615

[56] References Cited

U.S. PATENT DOCUMENTS 2,425,714 8/1947 Baer ..................................... 426/524

FOREIGN PATENT DOCUMENTS 486274 9/1952 Canada ................................ 426/509
2005983A 5/1979 United Kingdom .

Primary Examiner—George Yeung
Attorney, Agent, or Firm—Merchant, Gould, Smith, Edell, Welter & Schmidt

[57] ABSTRACT

A method of freezing peeled apple pieces is disclosed where the apple pieces are blanched in plain water, generally at a temperature of 85°–95° C., dried by convection hot air at 60° in less, and frozen.

3 Claims, No Drawings

DEHYDROFREEZING OF PEELED APPLE PIECES

The present invention relates to a method of freezing peeled apple pieces and the like wherein the apple pieces are blanched, dried and frozen.

One has already preserved apple pieces by deep-freezing, and in that case the procedure has been applied wherein the apple pieces initially have been dipped into a solution of ascorbic acid and/or sodium chloride or in a syrup and then have been frozen. In this procedure, the energy consumption during freezing is high, because a lot of water is frozen together with the apple pieces. Already for this reason the procedure is not satisfactory, but in addition to this the additives applied to the apple pieces by dipping may cause a defective taste, and the apple pieces when unfrozen, will be wet and swampy and in no way will behave as fresh apple pieces but will collapse.

According to the Swedish patent specification No. 125,580, vegetables, fruit, etc. are parboiled at about 100° C. Then, cooling in vacuum takes place, the evaporated water cooling down and drying the goods which are then frozen. Due to the fact that the product is parboiled at such high temperature as 100° C., the cell structure will be broken down and since it is reasonable to assume that too much water is left in the product at freezing and will cause bursting of the cells during freezing, the product after freezing and unfreezing will be soft and will have little resemblance with the fresh original, because it will lack the vitality and firmness which is characteristic for the fresh product.

U.S. patent specification No. 2,425,714 relates to quick-freezing of foods wherein the goods initially are blanched at a temperature over 74° C., but the temperature can be as high as 110° C. One has not realized the importance of the cells not being broken down, because it is not mentioned more precisely how far the drying of the products is to be carried, and also one has not realized that the temperature at blanching must not be too low, because the browning enzyme polyphenolic oxidase then will not be inhibited, which is necessary in order to avoid browning of the apple pieces. As in case of the Swedish patent specification No. 125,580 typically "boiled" products are concerned, which after unfreezing have little resemblance with the fresh product as far as vitality and firmness are concerned.

The British patent specification No. 2,005,983 relates to a method of preserving fruit, e.g. apples, or vegetables, which initially are boiled for 5 to 45 minutes at a temperature which is below about 82° C. Then, the goods are heated at a temperature in the range from 66° to 93° C. for 5 to 20 minutes in order to reduce the moisture content by about 1 to 15% before freezing takes place. Since the heating is carried to a temperature of more than 60° C., there will be formed at drying a skin on the surface of the goods being dried, which prevents liquid from being expelled from the goods. The products obtained according to the British patent specification obviously have to be boiled or fried before use.

A further preservation method has been applied to apple rings including initial treatment of the apple rings with sulphur to avoid miscolouring (browning), and then drying of the apple rings. The addition of sulphur is not desired, because such addition influences the smell as well as the taste.

Summarizing, it can be noted that so far nobody has realized the importance of the necessity of limiting the blanching to a specific temperature in order not to cause breakdown of the cells in the product being treated, and reducing the liquid content of these products to a low value and under such conditions that no miscolouring of the product is caused and no skin is formed on the product, which prevents continued expelling of liquid from the product.

In other words there is no satisfactory procedure of preserving apple pieces. The preserved product in no way will resemble the fresh product when it is to be used, and in the food handling the endeavour is to avoid as far as possible the use of additives.

The purpose of the invention is to provide a method of treating apple pieces and the like, by which there is obtained a product preserved by deep-freezing, which has, after unfreezing, the same firmness and vitality as a fresh apple and is at least as rich in aroma as the fresh apple and which contains no additives at all to prevent browning, and wherein there is no limitation as to the use of the unfrozen product which can be used in the same manner as fresh apples.

In order to explain the invention in more detail an illustrative application of the method of the invention will be described below.

When the apples have been peeled and the core has been removed, the apples are sliced or made into cubes of suitable size. The apple pieces then are blanched under strictly controlled conditions to inactivate the browning enzyme polyphenolic oxidase. This blanching takes place in pure water, i.e. water containing no additives at all, at a temperature in the range from 85° to 95° C. for a period of one to three minutes. At lower temperature the blanching has to take place for a longer period.

The blanched apple pieces then are dried also under strictly controlled conditions. Preferably the drying is performed by means of hot air in a convection dryer at a temperature in the range from 50° to 60° C., and the drying is carried to a specified water activity, preferably so far that the weight of the apple pieces is reduced to about half the weight. This may take about one hour depending on the size of the apple pieces and the construction of the convection dryer.

When the drying of the apple pieces has been completed, the apple pieces are immediately frozen at a temperature in the range from minus 30° to minus 40° C. (deep-freezing).

The product obtained in this manner is advantageous in many respects and is superior to the products obtained by the preservation methods now applied:

the product is more rich in aroma than a fresh apple, because the aroma substances have been concentrated by the drying;

no miscolouring occurs although no additives at all are used;

the product has a firm consistency and does not collapse during unfreezing; the product provides a noticeable chewing resistance;

contrary to fresh apples which will be pulpy when used e.g. in an apple cake, the apple pieces processed according to the invention will maintain after unfreezing their apple structure and firmness;

after unfreezing the apple pieces can be used in salads and pastries as they are without any pretreatment.

The method of the invention which can be termed "dehydrofreezing" and which has been successfully applied to apple pieces in accordance with the illustrative embodiment described above, according to indications obtained apparently could be applied also to other similar fruits such as pears, peaches, and apricots.

We claim:

1. A method of freezing peeled apple pieces, comprising the steps of blanching the peeled apple pieces in plain water at a temperature generally between 85°–95° C., drying the pieces with a convection flow of hot air at a temperature not exceeding 60° C. until the weight of the pieces is reduced to about one-half of its original weight, freezing the dried apple pieces.

2. A method according to claim 1 wherein said blanching occurs for one to three minutes.

3. A method according to claim 1 wherein said pieces are dried at a temperature between 50°–60° C.

* * * * *